(No Model.) 3 Sheets—Sheet 1.
H. J. JENSEN.
MECHANICAL MOVEMENT FOR PROPELLING VEHICLES.
No. 589,353. Patented Aug. 31, 1897.
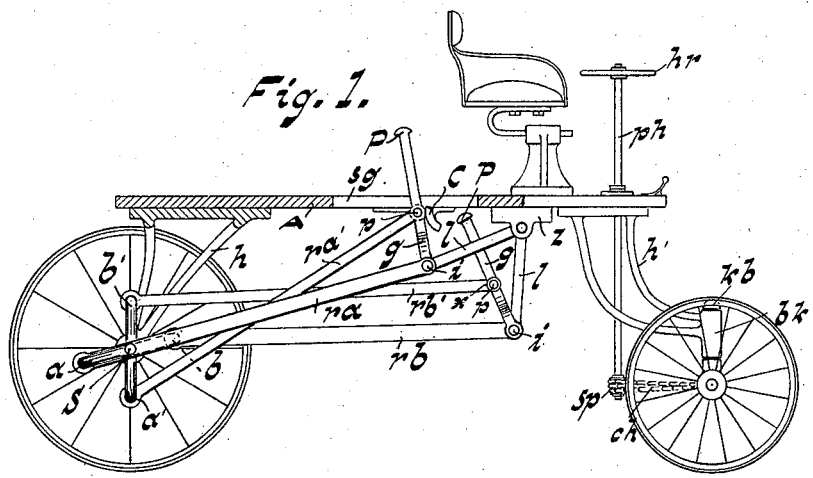
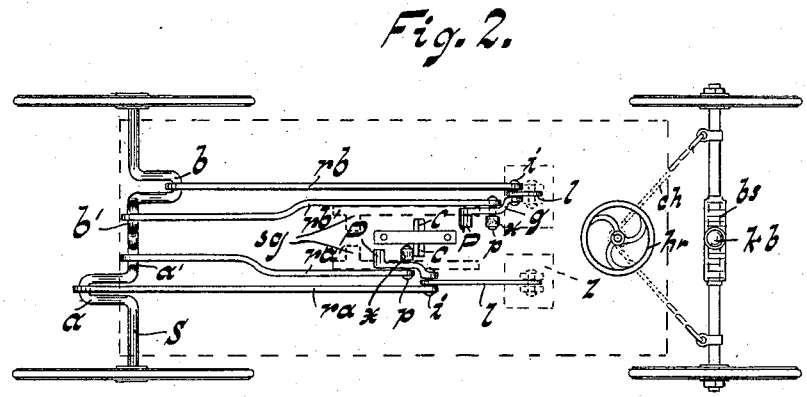
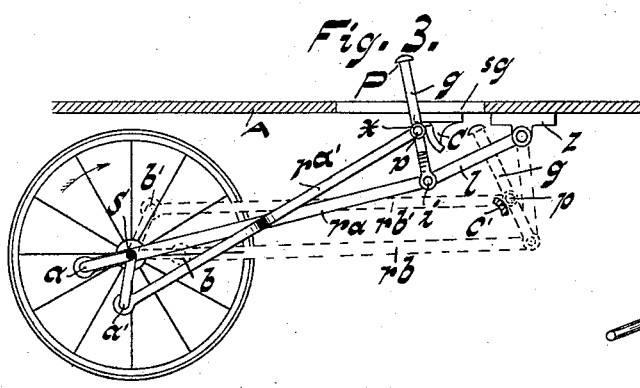
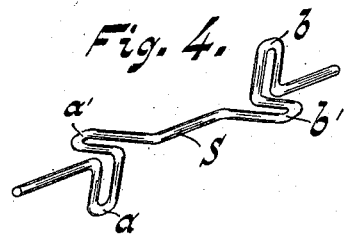
Witnesses
C. W. Kurz
Harry Calhoun
Henry J. Jensen, Inventor
By Schreiter, Van Iderstine & Mathews, his Attorneys.
THE NORRIS PETERS CO., PHOTO-LITHO., WASHINGTON, D. C.

(No Model.) 3 Sheets—Sheet 2.
H. J. JENSEN.
MECHANICAL MOVEMENT FOR PROPELLING VEHICLES.
No. 589,353. Patented Aug. 31, 1897.

(No Model.) 3 Sheets—Sheet 3.
H. J. JENSEN.
MECHANICAL MOVEMENT FOR PROPELLING VEHICLES.

No. 589,353. Patented Aug. 31, 1897.

Witnesses

Henry J. Jensen, Inventor

By Schreiter, Van Iderstine & Mathews, his Attorneys.

UNITED STATES PATENT OFFICE.

HENRY J. JENSEN, OF BROOKLYN, NEW YORK.

MECHANICAL MOVEMENT FOR PROPELLING VEHICLES.

SPECIFICATION forming part of Letters Patent No. 589,353, dated August 31, 1897.

Application filed January 25, 1897. Serial No. 620,638. (No model.)

*To all whom it may concern:*

Be it known that I, HENRY JACOB JENSEN, a subject of the Emperor of Germany, and a resident of Brooklyn, in the county of Kings and State of New York, have invented certain new and useful Improvements in Mechanical Movements for Propelling Vehicles, of which the following is a full, clear, and exact specification.

My invention relates to contrivances for propelling vehicles; and it consists in the hereinafter-described mechanism for driving a vehicle by pedaling of the rider (or driver) occupying the platform or seat of the vehicle. The mechanism is illustrated in the accompanying drawings, wherein—

Figure 5:
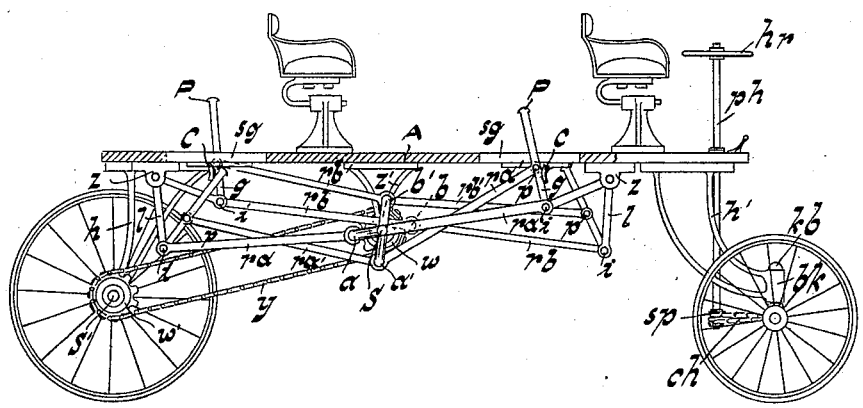

Figure 1 is an elevation, partly a longitudinal section, of a vehicle provided with my improved propelling mechanism. Fig. 2 is a top view thereof, the platform being indicated in dotted lines to disclose the operating parts of the mechanism. Fig. 3 is a partial view similar to Fig. 1, showing a modified construction of the mechanism. Fig. 4 is a perspective view of the driving-axle used in combination with my improved propelling mechanism. Fig. 5 is an elevation, partly in section, and Fig. 6 a top view, of a compound mechanism applied to a vehicle. Fig. 7 is an elevation, and Fig. 8 a top view, of a tricycle equipped with my improved driving mechanism, the steering-post being omitted in the latter figure.

Similar letters of reference indicate like parts in corresponding views.

The objects of my invention are to provide a mechanism for propelling vehicles wherein the full weight of the driver, in addition to the force of his exertion, is most directly applied to the driving of the vehicle and in such manner as to produce the best effect, and, further, to provide auxiliary contrivances for carrying automatically the cranks of the driving-axle over dead-centers, whereby again loss of power and reactions in the propelling mechanism are avoided.

The propelling mechanism illustrated in Figs. 1 and 2 consists of the crank-shaft S, (which is preferably the driving-axle of the vehicle,) provided with cranks $a$ and $b$, which I call the "main" cranks, and the auxiliary cranks $a'$ and $b'$, connecting-rods $ra$ and $rb$, connecting main cranks $a$ and pivoted (by pins $i$) to oscillating links $l$, which in turn are pivotally secured to brackets $z$, screwed to the bottom of the platform of the vehicle; connecting-rods $ra'$ and $rb'$, connecting the auxiliary cranks $a'$ and $b'$ to the gyrating links $g$, which latter parts are extended through slots $sg$ above the platform and are provided with a head P, forming a pedal, to which the driving power is applied. Pins $p$, connecting-rods $rb'$ and $ra'$, and links $g$ are extended toward the center of the vehicle. Their extension forms an abutment adapted to engage with the cam C, secured in corresponding position to the platform of the vehicle. By the coöperation of these parts and of the rods $r'$, $ra'$, and $rb'$ the auxiliary cranks $a'$ and $b'$ are assisted in carrying the principal cranks $a$ and $b$ over their dead-centers when the propelling mechanism is in the position shown in Fig. 1. The coöperation of these parts also prevents a reaction of the force operating pedal P upon the driving-axle of the vehicle.

When commencing the stroke from the position shown in Fig. 1, the force applied upon the pedal P will thus operate the auxiliary connecting-rod $ra'$, (the main crank $a$ and principal connecting-rod $ra$ being then in dead-center,) the abutting extension of the pin $p$ being pushed along the curved face of cam C until the main crank $a$ and rod $ra$ are moved over the dead-center, whereupon the link $g$ being in gyrating motion, and consequently moved forward with its lower end, the power on the pedal operates both rods simultaneously until again the auxiliary crank $a'$ and rod $ra'$ reach dead-center. Then the continuing pull on the principal connecting-rod will again draw the auxiliary crank $a'$ over the dead-center. This completes one half of the turn of the driving-shaft, and the same cyclus of operation is repeated with the other set of cranks during the other half of the turn. By this obviating of the dead-center the efficiency of the driving mechanism is considerably increased, its minimum moment being equal to that of a mechanism with a single connecting-rod when the crank is at an angle to one-half of the angle between $a$ and $a'$, subtended at the center of the shaft S to the line of the power operating upon the connecting-rod.

Further, it must be considered that the cranks and connecting-rods being in duplicate sets arranged angularly half a stroke apart will coact successively during the entire revolution of the driving-shaft, so that always while one crank and connecting-rod in one section is nearing its dead-center the corresponding crank and rod of the other section is passing through a segment of its greatest moment and maximum efficiency, so the aggregate minimum efficiency of all is at no point less than the maximum of a single crank.

When the pedal is at its highest point, (beginning of its stroke,) as illustrated in Fig. 1, the power applied to it exerts a tendency to turn the driving-shaft in an opposite direction by pulling on the connecting-rod $ra'$. This, however, is prevented by the engagement of pin $p$ against the cam C, which thus serves a double purpose. To relieve friction, roller X is set on pin $p$, as shown in Fig. 2. The angular difference in the position of the cranks $a$ and $a'$ is something less than a right angle on account of the gyrating of the pedal-link, which would otherwise not readily yield if the cranks $a$ and $a'$ would be situated at right angles to each other. In the construction shown in Fig. 3 two such cams C, as shown in Fig. 1, are used. The other, C′, located below, coöperates on the end of the stroke. The power is applied by the driver in the same manner.

The relative position of the cranks and connecting-rods is the same as in Fig. 1. The main crank and its connecting-rod of the set shown in full lines are in dead-center at the beginning of its stroke. In overcoming the tendency of the auxiliary connecting-rod to drive in an opposite direction the main crank and rod $rb$ of the other set (shown in dotted lines) coöperate just before reaching the last stage of its motion at the end of the stroke. The connecting-rod $rb'$ is drawn through pin $p$, engaging the cam C′. The cam causes the gyrating link $g$ to swing on pivot $p$, its lower end (and connecting-rod $rb$ pivoted to it) moving toward the driving-axle, whereby the crank $a$ is pushed over its dead-center. The advantage attained by this combination is that both sets of rods and gyrating links operate together, dividing the strain between them, whereby their work is equalized and smoother working and greater durability of the mechanism obtained. This construction will be preferable for heavier vehicles, such as track-cars, delivery-wagons, and the like.

Figure 6:
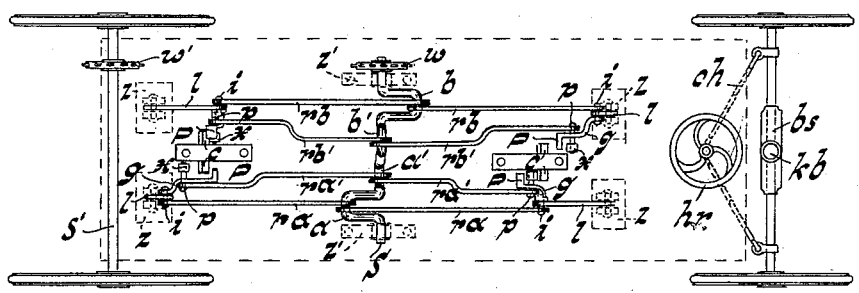
Figure 7:
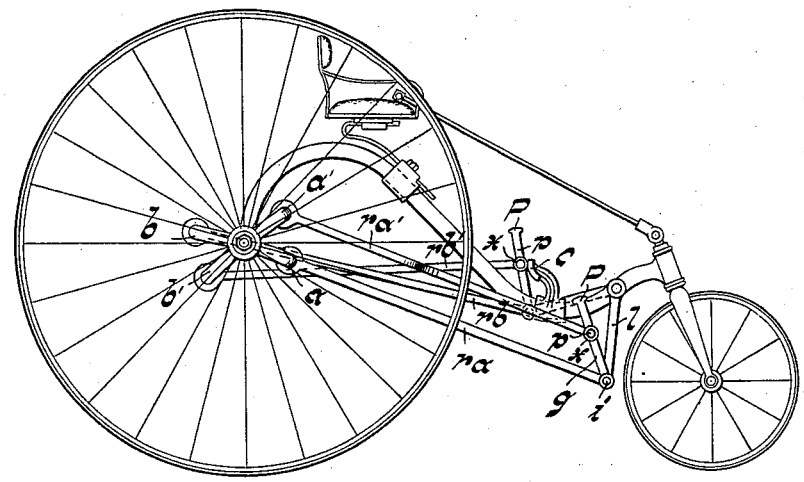

In the compound construction shown in Figs. 5 and 6, adapted for two drivers, (one behind each seat of the vehicle,) the driving-shaft is located in center of the vehicle and its motion transmitted by chain and sprocket-wheel to the driving-axle. In this modified form of my invention the crank (driving) shaft S is pillowed in hangers $z'$, secured to the bottom of the platform, and its motion is transmitted to the driving-axle S′ by chain $y$ and sprocket-wheels $w$ and $w'$, set on the crank-shaft S and axle S′, respectively.

The driving (crank) shaft S is provided with two sets of cranks, as in the construction described above. There are, however, two connecting-rods to each crank, two sets of oscillating links $l$, gyrating links $g$, and two cams C, similarly arranged as shown in Fig. 1. The drivers work concurrently upon the same set of cranks, and the vehicle may also be driven by one driver operating upon either set of pedals. There is no other diversity in this construction from that of the singly-acting mechanism described above.

The platform of the vehicle is provided with longitudinal slots $sg$ in similar manner as described above, through which the pedal-rods $g$ move up and down. The axles of the vehicle are pillowed in brackets $h$ and $h'$, respectively, the latter terminating into a bearing $bk$ for the king-bolt $kb$, forged of one piece with the bearing-sleeve $bs$. The vehicle is steered by turn-wheel $hr$, set on post $ph$, chain $ch$, whose ends are secured to the steering-axle and sprocket-wheel $sp$.

Figure 8:
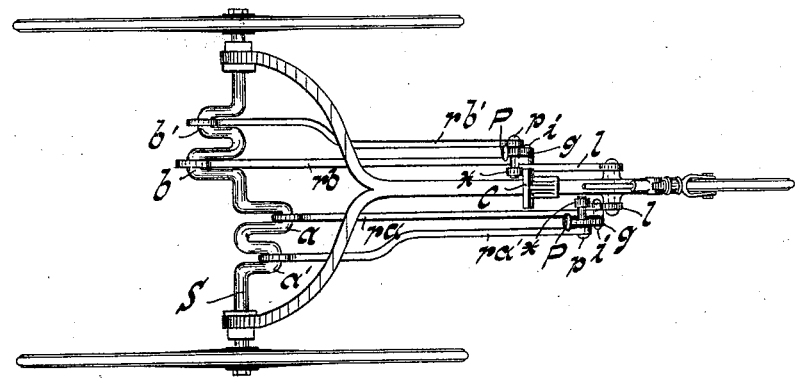

In Figs. 7 and 8 I have shown the singly-acting propelling mechanism applied to a tricycle. In this case the cam C is secured in a bracket to the bar connecting the main axle with the fork-stem of the steering-wheel, to which also links $l$ are pivoted. In other respects the construction is identical with that shown in Fig. 1 and described above.

I claim as my invention and desire to secure by Letters Patent—

1. A mechanism for propelling vehicles by the pedaling power of the rider, comprising a crank-shaft, having two sets of cranks, a main and an auxiliary crank, the main crank being angularly in advance of the auxiliary crank and the cranks of one set oppositely to the cranks of the other set; oscillating links, pivoted to the body of the vehicle, gyrating links, pivoted to the free ends of the oscillating links, and extended into pedals; main connecting-rods, connecting the main cranks to the joints of the oscillating with the gyrating links, auxiliary connecting-rods, connecting the auxiliary cranks to the gyrating links, stationary cams, diverting the motion of the gyrating links, secured to the body of the vehicle in suitable position, pins joining the connecting-rods to the gyrating links and projecting from the joint toward the cams, and antifriction-rollers set on the pins.

2. In mechanism for propelling vehicles by the pedaling power of the rider, of a crank-shaft, having two sets of cranks, a main and an auxiliary crank, the main crank being angularly in advance of the auxiliary crank and the cranks of one set oppositely to the cranks of the other set; oscillating links, pivoted to the body of the vehicle, gyrating links, pivoted to the free ends of the oscillating links, and extended into pedals; main connecting-rods, connecting the main cranks to the joints of the oscillating with the gyrating links, auxiliary connecting-rods, connecting the auxiliary cranks to the gyrating links, stationary cams, diverting the motion of the gyrating links, secured to the body of the vehicle in suitable position, pins joining the connecting-rods to the gyrating links and projecting from the joint toward the cams, and antifriction-rollers set on the pins, and of means for transmitting the motion of the crank-shaft to the axle of the vehicle.

In witness that I claim the improvements described in the foregoing specification I have signed my name in the presence of two subscribing witnesses.

HENRY J. JENSEN.

Witnesses:
HARRY CALHOUN,
ROBERT VALENTINE MATHEWS.